(12) United States Patent
Segal

(10) Patent No.: US 7,050,805 B2
(45) Date of Patent: May 23, 2006

(54) WIRELESS COMMUNICATION HANDOVER METHOD AND APPARATUS

(75) Inventor: Niranjan N. Segal, Arlington, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/832,017

(22) Filed: Apr. 26, 2004

(65) Prior Publication Data

US 2005/0239468 A1    Oct. 27, 2005

(51) Int. Cl.
*H04Q 7/22* (2006.01)

(52) U.S. Cl. .................. 455/436; 455/552.1; 455/555; 455/554.1; 455/462

(58) Field of Classification Search ........ 455/436–442, 455/454, 462, 463, 517, 550.1–553, 554.1–555; 370/331, 338, 436
See application file for complete search history.

(56) References Cited

U.S. PATENT DOCUMENTS

| | | | | |
|---|---|---|---|---|
| 5,239,682 | A | * | 8/1993 | Strawcynski et al. ....... 455/436 |
| 6,138,020 | A | * | 10/2000 | Galyas et al. ............... 455/436 |
| 6,223,054 | B1 | | 4/2001 | Katko |
| 2003/0114158 | A1 | * | 6/2003 | Soderbacka et al. ......... 455/436 |
| 2004/0146021 | A1 | * | 7/2004 | Fors et al. .................. 370/331 |
| 2005/0070288 | A1 | * | 3/2005 | Belkin et al. ............... 455/439 |

\* cited by examiner

*Primary Examiner*—Joseph Feild
*Assistant Examiner*—Kamran Afshar
(74) *Attorney, Agent, or Firm*—Simon B. Anolick

(57) ABSTRACT

When using a first wireless communication system to facilitate at least a first wireless communication and in response to detecting at least one handover condition, a mobile station can automatically use a second wireless communication system to establish a communication link to a private branch exchange that is associated with the first wireless communication system and automatically transmit a pre-established message to the private branch exchange to trigger a handover of the first wireless communication from the first wireless communication system to the second wireless communication system.

24 Claims, 3 Drawing Sheets

WIRELESS COMMUNICATION HANDOVER METHOD AND APPARATUS

FIELD OF THE INVENTION

This invention relates generally to wireless communication systems and more particularly to handing over a wireless communication from a first communication system to a second communication system.

BACKGROUND OF THE INVENTION

Various wireless communication systems are known and understood in the art. Many such systems accommodate the communication needs of mobile users. Many wireless communication systems only provide services within a given zone (or zones) of wireless coverage. As a result, when a mobile user moves from within a zone of wireless coverage to an area without service, a then-present wireless communication will typically be dropped.

System designers have a growing desire to avoid such dropped or interrupted communications. For example, there is present conceptual interest in facilitating a handover of a present wireless communication from a first wireless communication system (such as a wireless local area network) to a second wireless communication system (such as a wireless wide area network).

The basic concept of transferring a present wireless communication from a first wireless base site to another is known. Cellular telephony systems are an example of a wireless wide area network that internally accommodates such functionality. Unfortunately, at least at present, a handover from a first wireless system such as a wireless local area network to a second system such as a wide area network necessarily entails a system-to-system transfer as versus an internal transfer within a given system.

Additional concerns further complicate the matter. A typical wireless local area network (such as, for example, an 802.11-family compatible local area network) will use radio frequency resources, and have an infrastructure, that varies considerably from a typical wireless wide area network (such as, for example, a cellular telephony system). Multi-mode radios have been proposed that are capable of compatibly operating in two (or more) such divergent systems. Such intrinsic compatibility, however, does not necessarily lead to a satisfactory ability to effect a relatively transparent handover of a given wireless communication between such divergent systems.

BRIEF DESCRIPTION OF THE DRAWINGS

The above needs are at least partially met through provision of the wireless communication handover method and apparatus described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

Generally speaking, pursuant to these various embodiments, upon detecting—2—at least one handover condition during a wireless communication being supported by a first wireless communication system, a preferred process automatically uses a second wireless communication system to establish a communication link to a private branch exchange that is associated with that first wireless communication system. This preferred process then uses that communication link to automatically transmit to that private branch exchange a pre-established message to thereby effect triggering a handover of the wireless communication from the first wireless communication system to the second wireless communication system. The wireless communication thereafter continues using that second wireless communication system instead of the first wireless communication system.

The pre-established message can comprise a specific signal or can be embodied more indirectly. For example, pursuant to one approach, the establishment of the communication link itself can comprise the pre-established message. Additional signals may be applied in either case as desired to permit, for example, identification of a corresponding mobile user (or users), authentication, authorization, and the like.

So configured, and as an illustrative example, a wireless communication between a wireless mobile user and a landline party that is presently supported by a wireless local area network (such as an 802.11-family compatible network) can be transferred to and continued on a wide area network (such as a cellular telephony system). In a preferred approach this transition occurs substantially transparently to all communicating parties and without interrupting the communication-in-progress.

These and other benefits will become more evident to those skilled in the art upon making a thorough review and study of the following detailed description.

Figure 1:
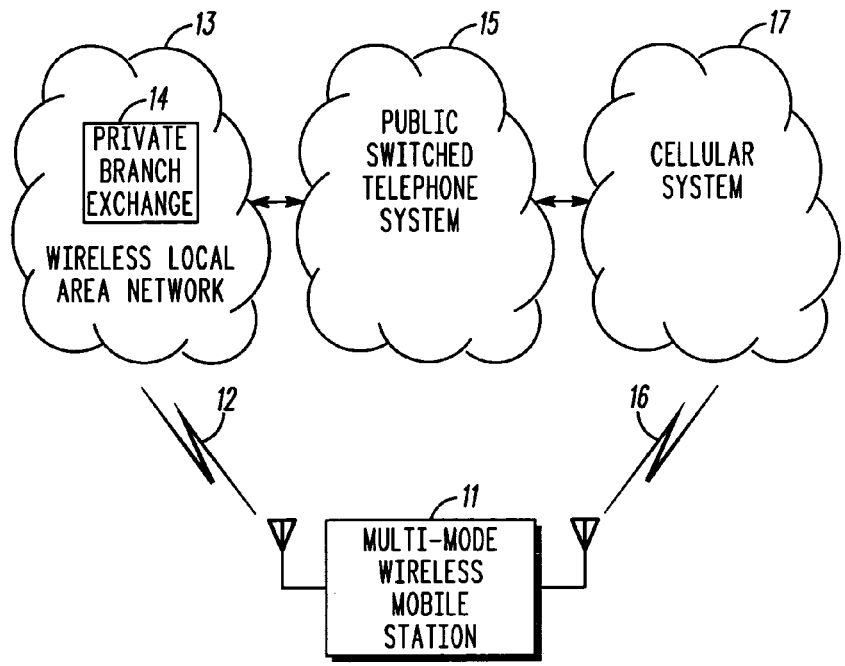
FIG. 1 comprises a block diagram as configured in accordance with various embodiments of the invention.

Referring now to the drawings, and in particular to FIG. 1, for purposes of providing an illustrative but non-exhaustive example to facilitate this description, a specific operational paradigm will now be presented. Those skilled in the art will recognize and appreciate that the specifics of this illustrative example are not specifics of the invention itself and that the teachings set forth herein are applicable in a variety of alternative settings.

Pursuant to this example, a multi-mode wireless mobile station 11 can compatibly transceive radio frequency communications 12 with a wireless local area network 13 and also compatibly transceive radio frequency communications 16 with a cellular system 17. The wireless local area network 13 can comprise, for example, an 802.11(b), or 802.11(g) network as are well understood in the art and the cellular system 17 can comprise, for example, an analog system, a time division multiplexed system, a code division multiplexed system, or the like. In this embodiment, both the wireless local area network 13 and the cellular system 17 further operably couple to a public switched telephone system 15. So configured, the multi-mode wireless mobile station 11 can communicate with, for example, a landline party through the public switched telephone system 15 via either the cellular system 17 or the wireless local area network 13 in accord with well-understood prior art technique. To effect such a communication using the wireless local area network 13, a private branch exchange (PBX) 14 as is associated with (and often comprises a part of) an enterprise-based wireless local area network 13 serves to provide a facilitating interface as between the multi-mode wireless mobile station 11 and the public switched telephone system 15, again in accord with well understood prior art technique and methodology.

Pursuant to these teachings, such a multi-mode wireless mobile station 11 as is presently communicating with a landline party using a wireless local area network communication resource 12 will be able to transparently transfer that communication to a cellular system communication resource 16. This, in turn, will permit such a platform to begin a communication within range of the wireless local area network 13 and to seamlessly continue that communication when moving out of range of that wireless local area network 13 during that communication.

Figure 2:
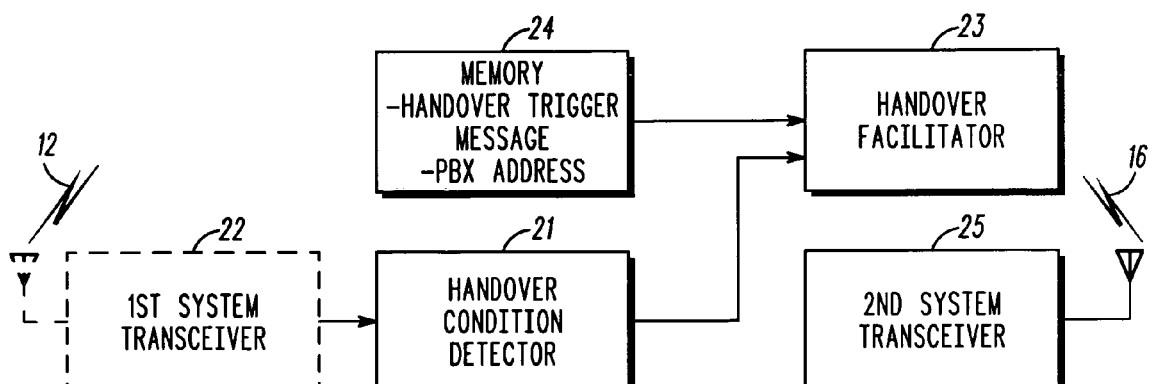
FIG. 2 comprises a block diagram of a multi-mode wireless mobile station as configured in accordance with various embodiments of the invention.

The multi-mode wireless mobile station 11 can be configured and architected in various ways to implement the teachings set forth herein. Again, for purposes of illustration and without comprising an exhaustive delineation of all possible useful platforms in this regard, a specific multi-mode wireless mobile station platform suitable for these purposes will now be described with reference to FIG. 2. This multi-mode wireless mobile station 11 will preferably comprise a wireless communication system handover condition detector 21. Such a detector 21 will typically operably couple to a first wireless communication system transceiver 22 and will serve to monitor and detect when one or more conditions exist that serve as indicia of a potential or actual need to handout a present wireless communication being supported by a first wireless communication system communication resource 12 to a second wireless communication system. Many such conditions and/or telltale indicators of such conditions are known in the art and include but are not limited to fading rates, bit error rates, signal to noise ratios and measures, and the like. It may also be anticipated that other indicators in this regard may be identified and developed in the future. These teachings are not dependent upon any particular presently known or hereafter-developed technique and may likely be used successfully with all such approaches. In the present illustrative scenario, where the first wireless communication system comprises a wireless local area network as described above, the handover condition detector 21 serves to detect when a present communication should be handed out from the wireless local area network to a wide area network cellular system.

The handover condition detector 21 operably couples to a handover facilitator 23 that also operably couples to a memory 24. This memory 24 preferably has a message stored therein comprising a handover trigger along with an address that corresponds to the private branch exchange that is associated with the first wireless communication system.

Pursuant to one approach, the handover trigger message can comprise, for example, an in-band message (such as a multi-frequency or dual-tone multi-frequency encoded message). This message can also comprise, for example, an identification (such as a personal identification number) as corresponds to the multi-mode wireless mobile station 11, an authentication and/or authorization code as corresponds to the multi-mode wireless mobile station, the private branch exchange, the first wireless communication system, a specific instruction or response, and so forth, or such other content may be desired and/or appropriate in a given setting.

Pursuant to another approach, the establishment of a communication path to the private branch exchange using the indicated address can serve, in of itself, as a handover trigger. More details regarding these approaches are provided below where appropriate.

So configured, the handover facilitator 23, in response to detection of a handover condition by the handover condition detector 21, can use the private branch exchange address and the handover trigger message from the memory 24 to cause a second wireless communication system transceiver 25 (such as, in the present illustrative example, a cellular telephone transceiver) to address the private branch exchange and present the handover trigger message. This, in turn, permits the multi-mode wireless mobile station 11 to control to a significant extent its own handover behavior and process.

Those skilled in the art will recognize that a multi-mode wireless mobile station 11 will typically include other elements and/or functionality to serve other desired purposes. Such additional elements and functionality are not shown here in order to provide clarity with respect to that which is described. Those skilled in the art will also recognize that these various elements, including the handover condition detector 21 and the handover facilitator 23, can be configured as discrete components (as suggested by the illustration) or in common with a shared platform. For example, many wireless communication platforms are partially or fully programmable. In such a case the programmable portion of the platform can be readily programmed to accord with these teachings. It will also be understood that the memory 24 can be discrete from or integral to one or more of the above-described components. Such architectural and configuration options are well understood in the art and require no further elaboration here.

Figure 3:
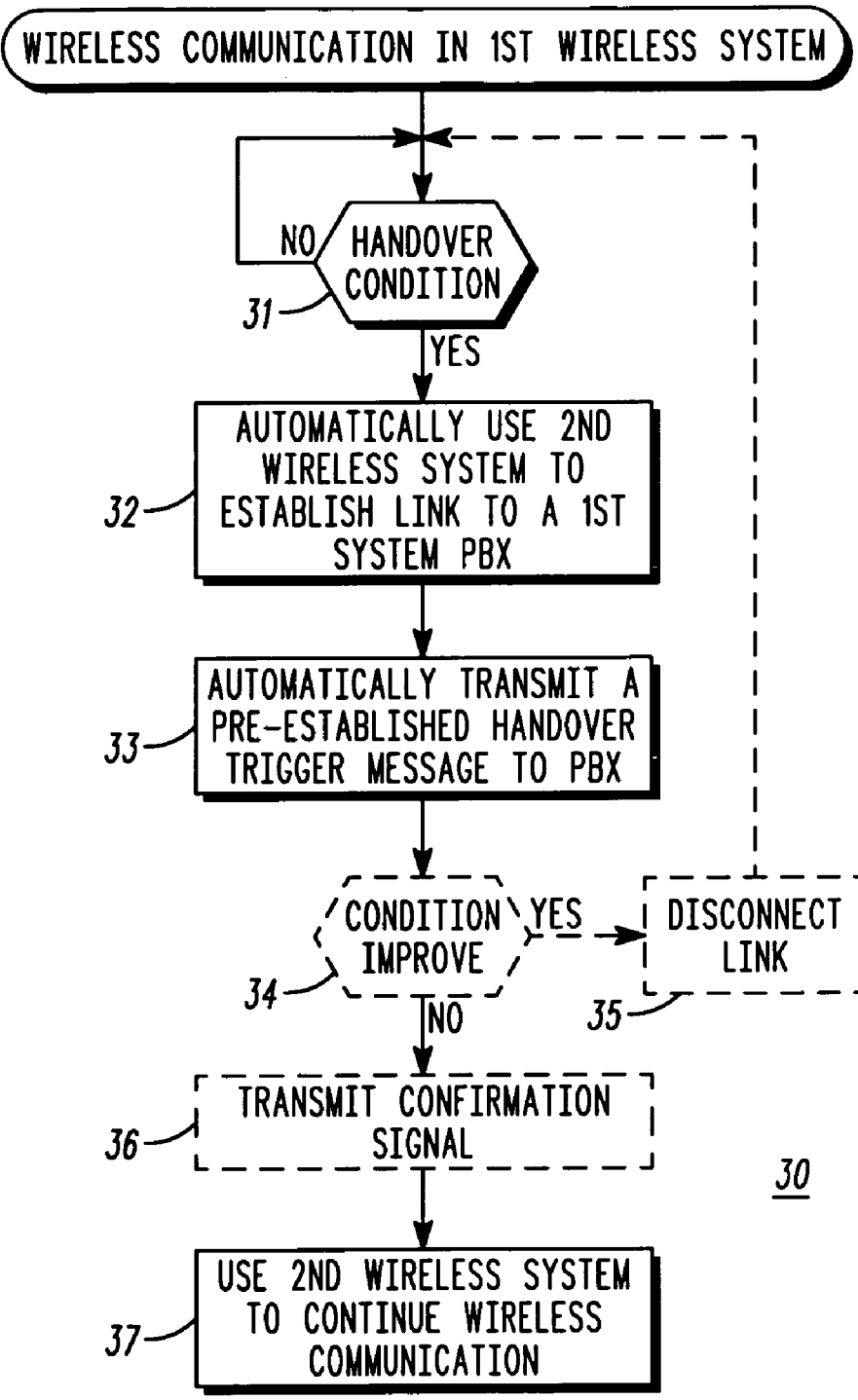
FIG. 3 comprises a flow diagram as configured in accordance with various embodiments of the invention.

Various embodiments of a process 30 that can be readily implemented by the above-described apparatus (or such other enabling platform as may be preferred or desired) will now be described with reference to FIG. 3.

During the course of a wireless communication as facilitated by a first wireless communication system (such as, but not limited to, a wireless local area network), this process 30 monitors for the presence of one or more predetermined handover conditions. Upon detecting 31 such a handover condition, this process 30 provides for automatic use of a second wireless communication system (such as a wide area network) to establish a communication link to a private branch exchange that is associated with the first wireless communication system. For example, when the second wireless communication system comprises a cellular telephone system, this process 30 can cause the automatic dialing of a cellular telephone transceiver portion of a corresponding multi-mode wireless mobile station. More particularly, the mobile station can call a wide area telecommunications service number that correlates to the private branch exchange such as, but not limited to, a specific toll free number (for example, 1 800 555-1234).

In a preferred embodiment, this step utilizes an address for the private branch exchange that relates uniquely to that private branch exchange. More particularly, in a most preferred embodiment, the private branch exchange utilizes that incoming wide area telecommunications service number only to facilitate handover tasks.

The process 30 then uses that communication link to automatically transmit 33 a pre-established message to the private branch exchange to trigger a handover of the present wireless communication from the first wireless communication system to the second wireless communication system. This "message" can be embodied in a variety of different ways.

For example, by one approach, the message can comprise a specific instruction, operational code (or codes), or other signals that are understood by the private branch exchange to signal a need to presently effect a handover of a presently supported wireless communication from the private branch exchange's network to another network. Such an explicit message can of course be conveyed in a variety of ways. Digital signaling can of course be used if modem capabilities are present at both the mobile station and the private branch exchange. It would also be possible, and possibly preferred, to encode this message using in-band dual-tone multi-frequency signaling as is well understood in the art.

In a preferred approach this transmission also includes some identification that corresponds to the user (and/or the mobile station itself, depending upon the identifier deployment scheme utilized in a given system). This identification can be used by the private branch exchange to identify the particular wireless communication that is to be handed over. Pursuant to one approach this identifier can comprise a specific in-band portion of the transmission. By another approach, this identifier can comprise a data header (for example, when caller-ID service will suffice to provide the private branch exchange with sufficient information to suitably identify the communication to be transferred).

Depending upon the needs of a given embodiment, this transmission 33 can also include other content such as, but not limited to, an authorization code that serves to further authorize or empower the private branch exchange to effect the requested handover, an authentication code to permit further identification of the mobile station (or its user) (as may be required by the first wireless communication system, the second wireless communication system, or both), a specific target time for the handover to occur, billing or other accounting information, presence update information, and the like.

As noted above, in some embodiments, the address used to contact the private branch exchange, such as a specific toll-free telephone number, can be dedicated to exclusive use for these purposes. Accordingly, a mobile station would only dial this number when seeking to initiate the handover process. When so configured, the message conveyed via this communication link can be relatively brief and may, if desired, essentially comprise only an identifier for the mobile station itself. In such an embodiment, the private branch exchange can be configured to simply recognize the call itself as the pre-established handover trigger and to automatically respond to such an incoming call with the handover process.

Pursuant to some embodiments, the handover process, once initiated, will automatically proceed to conclusion. If desired, however, this process 30 can optionally make a determination 34, subsequent to initiating the handover process but prior to the handover itself, as to whether there has been mitigation of the earlier detected handover condition. For example, if signal strength comprised the monitored parameter, and signal strength for a given communication had dropped below a predetermined threshold to thereby trigger the above-described sequence of events, the mobile station could determine whether that signal strength parameter had returned to an acceptable level prior to the handover process being completed. Upon determining 34 that conditions had improved, this process 30 could essentially terminate the handover process. This termination could comprise, for example, a disconnection 35 of the communication link to the private branch exchange. By another approach, the mobile station could transmit a specific handover termination message to the private branch exchange via the communication link to facilitate termination of the handover process.

When monitored conditions have not improved (when subsequent handover conditions optionally remain relevant to the handover process as described above), or if otherwise desired, this process 30 can effect transmission 36 of a predetermined handover confirmation message to the private branch exchange (again using the communication link). Such an approach, for example, can be useful when the private branch exchange has been configured to prepare a handover but to not effect completion of the handover absent receipt of a specific confirmation message from the mobile station. This approach can be particularly useful when employed in conjunction with continued handover condition monitoring as this approach can provide sufficient time to permit a reasonable window of inquiry to detect a possible change for the better.

To conclude, this process 30 then effects usage 37 of the second wireless communication system (and termination of the first wireless communication system) to support the continuation of the wireless communication. In a preferred approach this transmission can be made without interruption to the communication itself. For example, the private branch exchange can cause such a handover by using the wide area network call as was initiated by the mobile station and transferring the present call to that wide area network call leg. The first wireless communication system leg can then be dropped by the private branch exchange, the mobile station, or both to complete the handover process.

Figure 4:
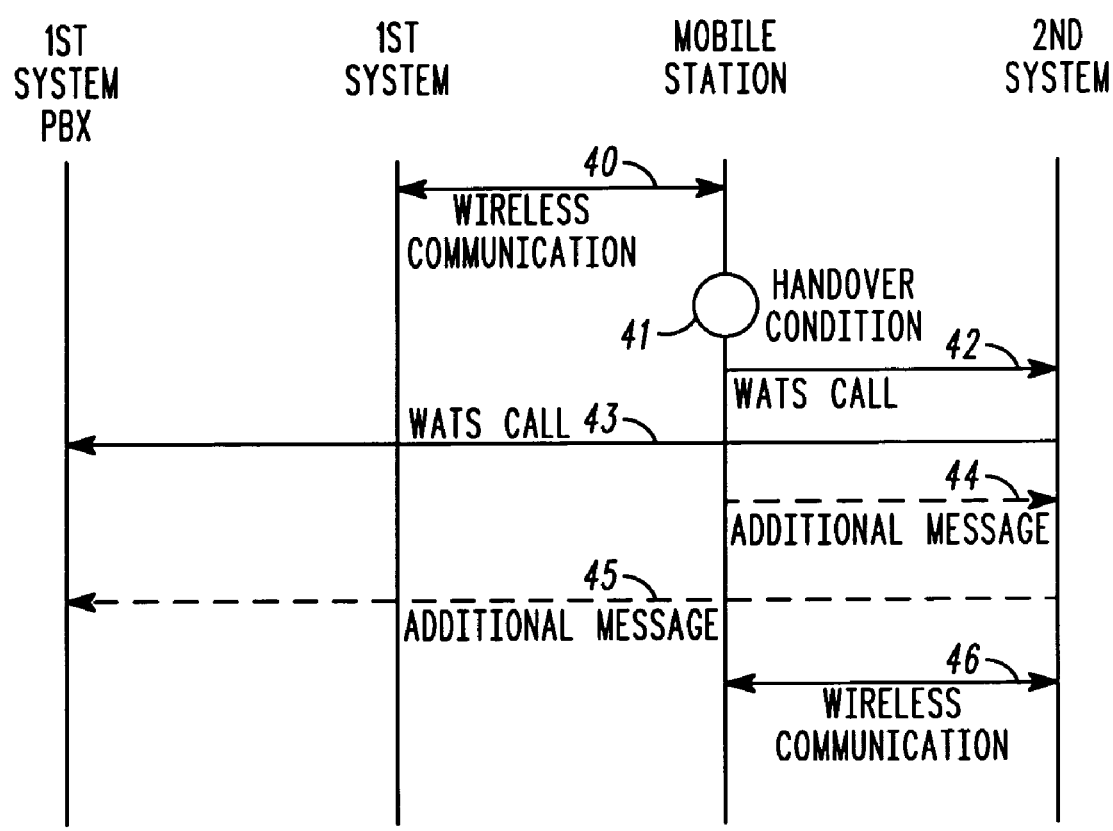
FIG. 4 comprises a signal flow diagram as configured in accordance with various embodiments of the invention.

To illustrate, and referring now to FIG. 4, a mobile station engaged in a wireless communication 40 via a first system, upon detecting a handover condition 41 of concern, can initiate a wide area telecommunications service telephone number call 42 and 43 via the second system to the private branch exchange. As noted above, this communication, alone or in conjunction with additional massaging (44 and 45) (again via the second system) serves to notify the private branch exchange of the need to handover a present communication 40 for mobile station from the first system being served by the private branch exchange to the second system. The private branch exchange responds by transferring the present call to that new leg 46.

So configured, multi-mode mobile stations can achieve transparent multi-system support for wireless communications. These teachings are sufficiently flexible to permit such benefits even when effecting a handover from a session initiation protocol-based network to a cellular telephony system. Moreover, this solution is relatively easily implemented without significant impact on most infrastructure elements and will further serve well regardless of variations as are presently found from one private branch exchange to another. Those skilled in the art will recognize other benefits as well, including but not limited to minimization of the risk of losing a call during handout by reducing required handover set-up time, as well as a lack of handover dependence upon specific protocols such as H323, session initiation protocol, and the like.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, when the mobile communication unit is engaged or otherwise supporting more than one communication in the first wireless system (for example, when supporting call waiting, hold, multi-party services, and so forth), all of those communications can be handed over using these same teachings.

I claim:

1. A method comprising:
   while using a first wireless communication system to facilitate at least a first wireless communication and in response to detecting at least one handover condition:
   automatically using a second wireless communication system to establish a communication link to a private branch exchange (PBX) that is associated with the first wireless communication system;
   automatically transmitting to the PBX using the communication link a pre-established message being an in-band message to trigger a handover of the first wireless communication from the first wireless communication system to the second wireless communication system;
   continuing the first wireless communication using the second wireless communication system instead of the first wireless communication system;
   wherein the in-band message further comprises an in-band dual tone multi-frequency message and an authorization code.

2. The method of claim 1 wherein the first wireless communication system comprises a wireless local area network.

3. The method of claim 2 wherein the wireless local area network comprises an 802.11-compliant network.

4. The method of claim 1 wherein the second wireless communication system comprises a cellular telephony system.

5. The method of claim 1 wherein:
   the first wireless communication system comprises a wireless local area network;
   the second wireless communication system comprises a cellular telephony system.

6. The method of claim 1 wherein automatically using a second wireless communication system to establish a communication link to a private branch exchange (PBX) that is associated with the first wireless communication system further comprises using the second wireless communication system to call a wide area telecommunications service number.

7. The method of claim 6 wherein the wide area telecommunications service number comprises a toll-free number.

8. The method of claim 6 wherein the wide area telecommunications service number correlates to the PBX.

9. The method of claim 1 wherein:
   automatically using a second wireless communication system to establish a communication link to a private branch exchange further comprises using a wide area telephone service; and
   automatically transmitting to the PBX a pre-established message further comprises automatically dialing a specific telephone number that is reserved for handover facilitation usage.

10. The method of claim 9 and further comprising transmitting an identifier that identifies a mobile communication unit that seeks to effect the handover.

11. The method of claim 9 and further comprising:
    when monitored conditions for the first wireless communication system do not improve by at least a predetermined amount within at least a predetermined period of time of transmitting the pre-established message to the PBX, automatically transmitting a predetermined handover confirmation message to the PBX.

12. The method of claim 1 and further comprising:
    while using the first wireless communication system to facilitate at least a first wireless communication and in response to detecting at least one handover condition:
    detecting mitigation of the at least one handover condition;
    terminating the handover of the first wireless communication from the first wireless communication system to the second wireless communication system.

13. The method of claim 12 wherein terminating the handover of the first wireless communication from the first wireless communication system to the second wireless communication system further comprises using the communication link to transmit a message to the PBX to facilitate termination of the handover.

14. A multi-mode wireless mobile station comprising:
    a first wireless communication system handover condition detector;
    a memory having stored therein a message comprising a handover trigger and an address for a private branch exchange (PBX) that is associated with the first wireless communication system;
    a second wireless communication system transmitter;
    a handover facilitator that:
    is configured to be coupled to the memory;
    is responsive to the first wireless communication system handover condition detector;
    has a PBX address output configured to be coupled to a communication target address input of the second wireless communication system transmitter;
    has a handover message trigger output configured to be coupled to a message input of the second wireless communication system transmitter.

15. The multi-mode wireless mobile station of claim 14 wherein the first wireless communication system handover condition detector comprises a wireless local area network handover condition detector.

16. The multi-mode wireless mobile station of claim 15 wherein the second wireless communication system transmitter comprises a cellular telephony transmitter.

17. The multi-mode wireless mobile station of claim 16 wherein the message comprises an in-band message.

18. The multi-mode wireless mobile station of claim 17 wherein the in-band message comprises a dual-tone multi-frequency message.

19. The multi-mode wireless mobile station of claim 18 wherein the message comprises, at least in part, an identification of the multi-mode wireless mobile station.

20. The multi-mode wireless mobile station of claim 19 wherein the message further comprises, at least in part, an authentication code.

21. A method for facilitating a handover of a wireless communication from a first wireless communication system to a second wireless communication system that is different than the first wireless communication system comprising:
    at a dual mode mobile station:

detecting a handover condition with respect to the wireless communication;

while continuing the wireless communication using the first wireless communication system, automatically using the second wireless communication system to transmit a handover trigger message to a private branch exchange (PBX) that is associated with the first wireless communication system,wherein the handover trigger message being an in-band message:

wherein the in-band message further comprises an in-band dual tone multi-frequency message and an authorization code;

at the PBX:

receiving the handover trigger message;

transferring the wireless communication to the second wireless communication system and concluding the first wireless communication system facilitation of the wireless communication;

at the dual mode mobile station:

dropping the first wireless communication system while maintaining the wireless communication using the second wireless communication system.

22. The method of claim 21 wherein the first wireless communication system comprises a wireless local area network and the second wireless communication system comprises a cellular telephony system.

23. The method of claim 21 wherein automatically using the second wireless communication system to transmit a handover trigger message to a PBX further comprises establishing a second wireless communication system communication link and wherein transferring the wireless communication to the second wireless communication system further comprises transferring the wireless communication to the second wireless communication system communication link.

24. The method of claim 21 wherein automatically using the second wireless communication system to transmit a handover trigger message to a PBX that is associated with the first wireless communication system further comprises dialing a wide area telecommunications system toll-free number that corresponds to the PBX.

* * * * *